United States Patent
Lundin et al.

(10) Patent No.: US 12,366,500 B2
(45) Date of Patent: Jul. 22, 2025

(54) SYSTEM AND METHOD FOR DETERMINING A CONCENTRATION OF A GAS IN A CONTAINER

(71) Applicant: GasPorOx AB, Lund (SE)

(72) Inventors: Patrik Lundin, Harlösa (SE); Mikael Sebesta, Dalby (SE); Anders Långberg, Veberöd (SE); Märta Lewander Xu, Lund (SE)

(73) Assignee: GasPorOx AB, Lund (SE)

( * ) Notice: Subject to any disclaimer, the term of this patent is extended or adjusted under 35 U.S.C. 154(b) by 123 days.

(21) Appl. No.: 17/998,760

(22) PCT Filed: May 14, 2021

(86) PCT No.: PCT/EP2021/062899
§ 371 (c)(1),
(2) Date: Nov. 14, 2022

(87) PCT Pub. No.: WO2021/229089
PCT Pub. Date: Nov. 18, 2021

(65) Prior Publication Data
US 2024/0011862 A1    Jan. 11, 2024

(30) Foreign Application Priority Data

May 14, 2020 (SE) .................. 2050571-5

(51) Int. Cl.
*G01M 3/22* (2006.01)
*G01N 21/03* (2006.01)
*G01N 21/39* (2006.01)

(52) U.S. Cl.
CPC ........ *G01M 3/227* (2013.01); *G01N 21/0303* (2013.01); *G01N 21/39* (2013.01);
(Continued)

(58) Field of Classification Search
CPC .... G01M 3/227; G01M 3/38; G01N 21/0303; G01N 21/39; G01N 21/61; G01N 21/90;
(Continued)

(56) References Cited

U.S. PATENT DOCUMENTS

| | | | |
|---|---|---|---|
| 8,994,948 B2 * | 3/2015 | Tondello | G01N 21/31 356/437 |
| 2014/0029007 A1 | 1/2014 | Yokobayashi et al. | |

(Continued)

FOREIGN PATENT DOCUMENTS

| | | |
|---|---|---|
| EP | 3208585 A1 | 8/2017 |
| JP | 2016-520838 A | 7/2016 |
| WO | WO 2014/191438 A1 | 12/2014 |

OTHER PUBLICATIONS

International Search Report and Written Opinion issued in International Application No. PCT/EP2021/062899 dated May 8, 2021.
(Continued)

*Primary Examiner* — Kara E. Geisel
*Assistant Examiner* — Jonathon Cook
(74) *Attorney, Agent, or Firm* — Knobbe, Martens, Olson & Bear, LLP

(57) ABSTRACT

A system and method is for determining a concentration of at least one gas in a container having at least one side with a flexible area. The system includes a measuring area arranged for receiving the container; a suction device arranged for pulling at least one portion of the flexible area a distance to arranging at least the portion of the flexible area in a position to provide a space underneath at least the portion of the flexible area; an optical sensor, configured to be sensitive to the at least one gas, is arranged in relation to the measuring area for transmitting a light signal through the space and detecting a transmitted light signal; and a controller configured for determining, based on the transmitted
(Continued)

light signal, the concentration of the at least one gas in the container.

19 Claims, 5 Drawing Sheets

(52) U.S. Cl.
CPC ............... *G01N 2021/0364* (2013.01); *G01N 2021/399* (2013.01)

(58) Field of Classification Search
CPC ........... G01N 21/9009; G01N 21/9081; G01N 2021/0364; G01N 2021/399; G01N 2021/1729
See application file for complete search history.

(56) References Cited

U.S. PATENT DOCUMENTS

| | | | |
|---|---|---|---|
| 2016/0169796 A1* | 6/2016 | Lewander Xu | .... G01N 21/0303 356/437 |
| 2019/0055598 A1 | 2/2019 | Buermann et al. | |
| 2019/0317014 A1 | 10/2019 | Kundert | |

OTHER PUBLICATIONS

Office Action issued in Swedish Application No. 2050571-5, dated Jan. 14, 2021.
Office Action issued in Japanese Application No. 2022-568876, dated May 7, 2025.

\* cited by examiner

SYSTEM AND METHOD FOR DETERMINING A CONCENTRATION OF A GAS IN A CONTAINER

BACKGROUND OF THE INVENTION

Field of the Invention

This disclosure pertains to determining a concentration of a gas and/or an integrity of a closed containers by performing optical measurements through a space obtained inside the container. The measurements include pulling and/or lifting at least a portion of a flexible area of the container to obtain the space and performing optical measurements through the space for determining a gas concentration in the container and/or an integrity of the container. Especially, the disclosure relates to non-destructive testing of containers such as packages, bags, and trays

Description of the Prior Art

Verification of the gas concentration inside a closed container or an integrity of a closed containers is important in many industrial settings. Examples include quality control of packaging of products such as food and pharmaceuticals. The integrity of sealed containers may be compromised e.g. by deficiencies in the sealing process, or in the barrier materials, or due to damage during the production process or handling. Determining the gas concentration inside a seal container or the integrity is important for several reasons, e.g., to keep any pre-filled gas composition inside the container at desired levels; and to keep outside atmospheric gases from entering the container. Otherwise degradation of the contents of the container may occur. For example, the level of oxygen or water vapour (moist) often determines the shelf life of the product. Other motivations for detecting leaks in containers are to verify the integrity of the container to substances other than gas, e.g., including but not limited to water, liquids, bacteria, viruses and other biological agents. By using gas-based leak detection, a guarantee of an intact package can be obtained, which is relevant to the integrity against these other substances.

Several means to verify the integrity of containers are known in the art. For example, flexible containers may be subjected to mechanical force to check the resistance of the pressure of the gas inside.

Systems and methods for measuring a concentration of a gas or an integrity of a seal container has been described in EP3004820. Movable attachment points are attached to at least one flexible wall of the container by moving them towards the container. When the attachment points have attached to the walls of the container, they are mechanically withdrawn bringing the container walls apart.

A robust optic based technology for fast analysing and determination of a gas concentration and/or the integrity of a seal container may be an advantage. Especially for determining the concentration of a case in a container having at least one flexible side or wall, such as a tray with a film or a bag. In particular an optical technology which could be implemented both at-line and in line.

SUMMARY

Accordingly, examples of the present disclosure preferably seek to mitigate, alleviate or eliminate one or more deficiencies, disadvantages or issues in the art, such as the above-identified, singly or in any combination by providing a system or method according to the appended patent claims for non-destructively determining a concentration of at least one gas in a sealed container and/or an integrity of a sealed containers.

The sensor may be an optical sensor. The optical sensor may be based on detecting an absorption in spectra in a transmitted light signal, for example by using Tunable diode laser absorption spectroscopy (TDLAS) technology. In a first aspect of the disclosure, a system for determining a concentration of at least one gas in a container having at least one side with a flexible area is described. The system may also be used for determining an integrity of a sealed container.

The system may include a measuring area arranged for receiving the container The system may further include a suction device arranged for pulling at least one portion of the flexible area a distance to arranging at least the portion of the flexible area in a position to provide a space underneath at least the portion of the flexible area. The system may also include an optical sensor, configured to be sensitive to the at least one gas, is arranged in relation to the measuring area for transmitting a light signal through the space and detecting a transmitted light signal. A control unit may be configured for determining, based on the transmitted light signal, the concentration of the at least one gas in the container.

In some examples, the optical sensor may include a light source arranged at a first side, and a detector arranged at a second side opposite the first side. In this configuration, the detector and the light source may be arranged on opposite side of the part of the flexible area being lifted.

In some examples, the optical sensor may include a light source and a detector arranged at a first side and a reflective surface is arranged at a second side opposite the first side. In this configuration, the detector and the light source may be arranged on the same side of the pulled or lifted flexible area and the reflective surface at an opposite side.

In some examples, an open cavity comprises an inner wall positioned so that an opening of the open cavity is arranged towards the measuring area, and when the container is positioned at the measuring area at least the portion of the flexible area is arranged towards the opening of the open cavity. Additionally, in some examples, the optical sensor may be arranged at the inner wall or being an integrated part thereof. Additionally, in some example, the suction device may be arranged to pull at least the portion of the flexible area into the open cavity towards the inner wall when the container is arranged at the measuring area.

In some example, the open cavity may be a part of the suction device and when a vacuum is arranged inside the open cavity at least a portion of the flexible area is positioned in the open cavity.

In some examples, a vibration element may be arranged for vibrating the flexible area when the light is transmitted through the space, such as vibrating the suction device.

In a further aspect of the disclosure, a method of determining a concentration of at least one gas in a container having at least one side with a flexible area is described. The method may include, positioning the flexible area in relation to an optical sensor, configured to be sensitive to the at least one gas. The method may further include pulling a portion of the flexible area a distance using a suction device for arranging at least a portion of the flexible area in a position to provide a space underneath at least the portion of the flexible area. The method may also include transmitting a light signal through the space using the optical sensor, and detecting a transmitted light signal using the optical sensor.

In yet another example, the method may include determining, based on the transmitted light signal, the concentration of the at least one gas in the container.

BRIEF DESCRIPTION OF THE DRAWINGS

These and other aspects, features and advantages of which examples of the disclosure are capable of will be apparent and elucidated from the following description of examples of the present disclosure, reference being made to the accompanying drawings, in which.

DETAILED DESCRIPTION OF THE PREFERRED EMBODIMENT

Figure 1A:
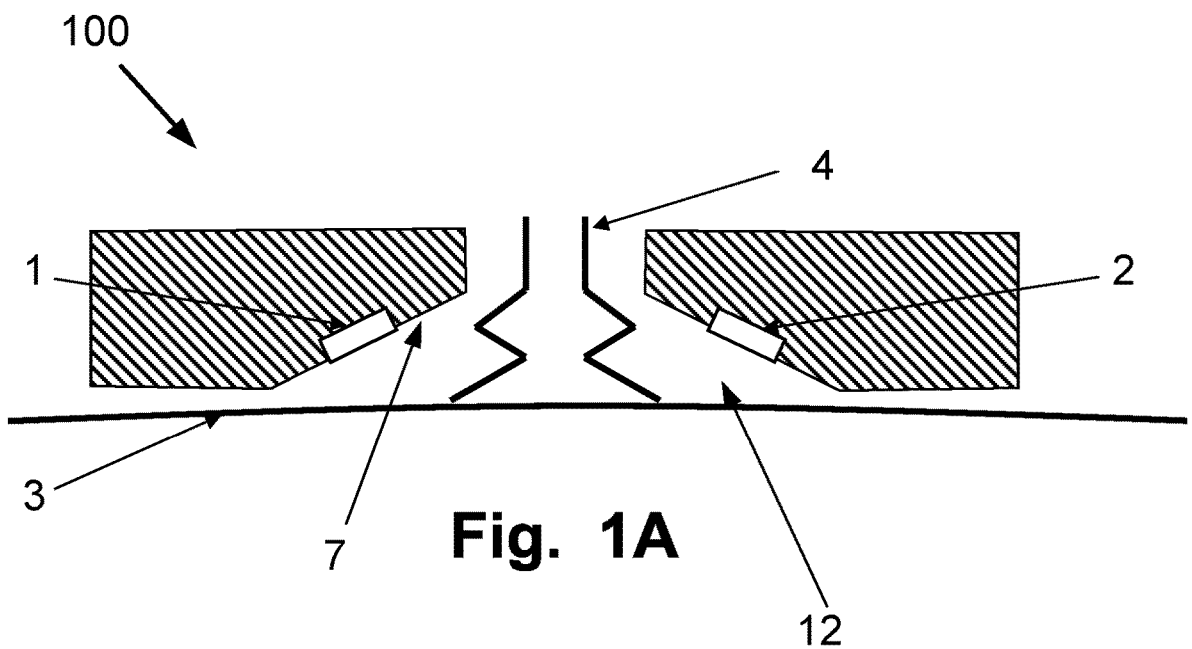
FIGS. 1A and 1B are illustrating a schematic example according to the disclosed system.

Specific examples of the disclosure will now be described with reference to the accompanying drawings. This disclosure may, however, be embodied in many different forms and should not be construed as limited to the examples set forth herein; rather, these examples are provided so that this disclosure will be thorough and complete, and will fully convey the scope of the disclosure to those skilled in the art.

The following disclosure focuses on examples of the present disclosure applicable to determining a concentration of a gas inside sealed containers and/or an integrity of sealed containers by pulling a portion of a flexible area towards an optical sensor for transmitting a light through a space obtained underneath the flexible area when being pulled.

The disclosure relates to non-destructive leak testing of closed and/or sealed containers, such as packages, bags, trays etc. For example, the disclosed systems and methods may be used to improve the detection of leaks from a closed package or container. However, it will be appreciated by the person skilled in the art that the description is not limited to this application but may be applied to many other systems where the integrity of closed containers needs to be determined.

A container may be a closed bag or closed tray that includes at least one species of a gas, Examples may be containers having a modified atmosphere (MAP). Modified atmosphere is commonly used in packages in order to improve the shelf life, for example in food packages, drugs, etc. gases commonly used are carbon dioxide (CO2) or nitrogen (N2) to lower the amount of oxygen (O2). This is made in order to slow down growth of aerobic organisms and prevent oxidation reactions. Hence it is important to monitor these packages and make sure that there is no leakage, for example during packaging. Apart from carbon dioxide (CO2), and oxygen (O2), other gases can be monitored as well, depending on the container and the product.

It is assumed that the container that is subject to measurement comprises of a transparent, semi-transparent or translucent material. Alternatively, the container may have a window made of a transparent, semi-transparent or translucent material, which at least partially covers a wall or side of the container.

At least a portion of a wall or side of the container may be non-rigid (flexible or soft), such as having a flexible area. Examples of such containers but not limited to are, flexible bags, e.g. bags made of plastic, or a tray with, for example, a covering cling films or plastic wrap, trays made of semi-rigid or rigid plastic used for food stuff.

By determining the optical path length and detecting the light which has travelled through the space obtained in the container, the absorption of a gaseous content may be calculated using, for example, Beer-Lambert law. The absorption may be used to calculate the concentration, or to determine if a gas is present. In some examples, this information may be used to determine an integrity of the container.

Alternatively, and/or additionally, in some examples, instead of determining the optical path length after it has been fixed, a calibration or reference may be used to obtain the concentration of a gaseous content. This may be performed as long as a similar pathlength may be obtained for each measurement.

Alternatively, and/or additionally, in some examples, only a qualitative measurement is obtained wherein the detected signal is compared to a reference signal or value to determine if there has been a changed to the concentration of the at least one gas. This may be performed by comparing the detected signal with a reference signal or value and determining if there has been an increase or decrease in the intensity of the detected signal. This may indicate an increase or decrease of the concentration of the at least one gas.

For determining a concentration and/or an integrity, absorption spectroscopy of gaseous content in a container may be preferred. Absorption spectroscopy may either be a full absorption spectrum or a signal from at least one discrete wavelength.

The optical sensor may be using spectroscopy technology, such as Tunable diode laser absorption spectroscopy technology (TDLAS), to detect the at least one gas. The at least one gas may be, for example carbon dioxide or oxygen. Both these gases are common in modified atmosphere packaging (MAP) which is used to prolong the shelf-life of, for example, food products. The at least one gas may also be, for example, water vapor, carbon monoxide or methane—gases which are also suitable to detect using an optical sensor, such as TDLAS. The amount of alternation of the level of at least one gas in the environment may be used to determine the size of the leak in the container.

Tunable diode laser absorption spectroscopy technology (TDLAS), such as GASMAS, is performed by having a light source sweeping the wavelength over an absorption peak of a free gas All determinations or calculations described herein may be performed by a control unit or a data processing device.

The control unit or a data processing device may be implemented by special-purpose software (or firmware) run on one or more general-purpose or special-purpose computing devices. In this context, it is to be understood that each "element" or "means" of such a computing device refers to a conceptual equivalent of a method step; there is not always a one-to-one correspondence between elements/means and particular pieces of hardware or software routines. One piece of hardware sometimes comprises different means/elements. For example, a processing unit serves as one element/means when executing one instruction, but serves as another element/means when executing another instruction. In addition, one element/means may be implemented by one instruction in some cases, but by a plurality of instructions in some other cases. Such a software controlled computing device may include one or more processing units, e.g. a CPU ("Central Processing Unit"), a DSP ("Digital Signal Processor"), an ASIC ("Application-Specific Integrated Circuit"), discrete analog and/or digital components, or some other programmable logical device, such as an FPGA ("Field Programmable Gate Array"). The data processing device may further include a system memory and a system bus that couples various system components including the system memory to the processing unit. The system bus may be any of several types of bus structures including a memory bus or memory controller, a peripheral bus, and a local bus using any of a variety of bus architectures. The system memory may include computer storage media in the form of volatile and/or non-volatile memory such as read only memory (ROM), random access memory (RAM) and flash memory. The special purpose software may be stored in the system memory, or on other removable/non-removable volatile/non-volatile computer storage media which is included in or accessible to the computing device, such as magnetic media, optical media, flash memory cards, digital tape, solid state RAM, solid state ROM, etc. The data processing device may include one or more communication interfaces, such as a serial interface, a parallel interface, a USB interface, a wireless interface, a network adapter, etc., as well as one or more data acquisition devices, such as an A/D converter. The special-purpose software may be provided to the control unit or data processing device on any suitable computer readable medium, including a record medium and a read-only memory.

Figure 1B:
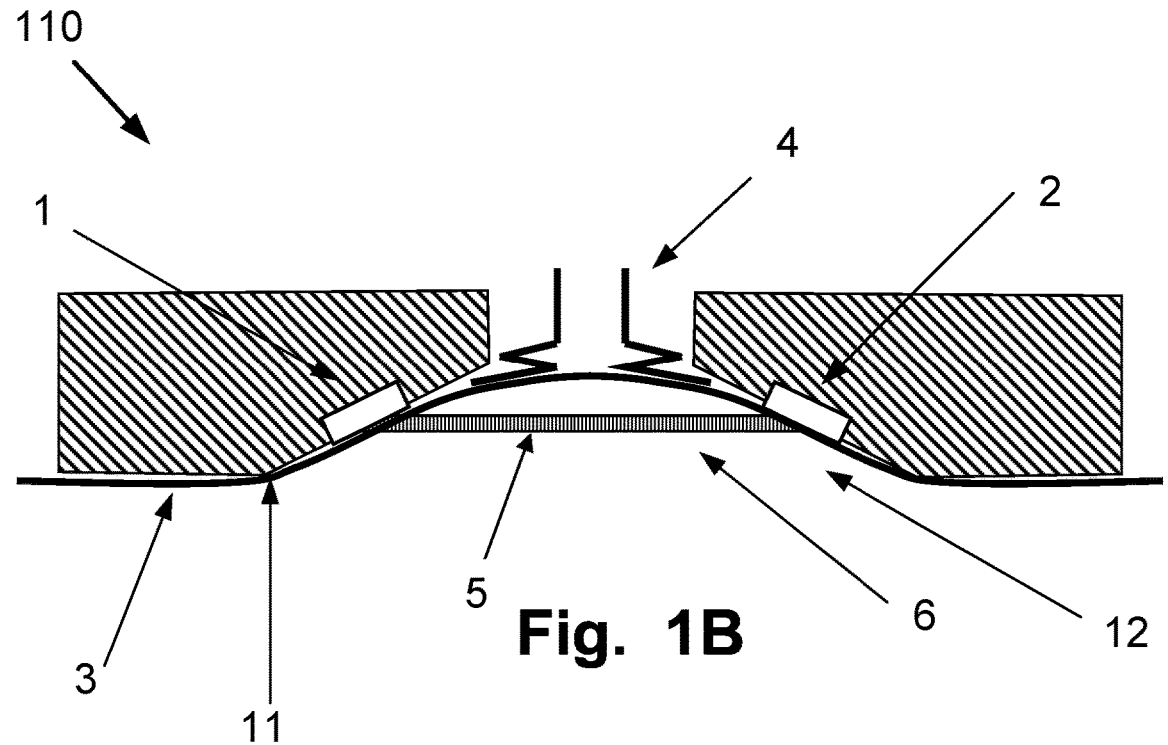

FIGS. 1A and 1B are illustrating a system 100, 110 for determining a concentration of at least one gas in a container having at least one side with a flexible area 3.

FIG. 1A is illustrating the system 100 before a portion of the flexible area 3 has been pulled into a predefined position, and FIG. 1B is illustrating the system 110 after the portion of the flexible area 3 has been pulled into a predefined position, such as the portion of the flexible area 3 may have obtained a predefined geometry.

The system may comprise a measuring area arranged for receiving the container (not illustrated). For an in-line application, the measuring area may be a position on a conveyor band in a manufacturing or packaging facility where the measurement is performed. In other applications, the measuring area may be a holder, a surface or any other arrangements configured for receiving and/or holding the container being investigated.

The system may also include an optical sensor 1, 2. The optical sensor may be sensitive to at least one gas inside the container.

The optical sensor may include one light source 1, and a detector 2. The light source and the detector may be spaced apart with a predetermined distance. Alternatively, the optical sensor 1, 2, may have the light source 1 and the detector 2 arranged at the same side and a reflective surface arranged at the opposite side.

In the described system, the light source 1 may be a white light source, for example transmitting a collimated light beam, or at least one laser source, such as a diode laser, a semiconductor laser. The wavelengths or wavelength range used for the light source is selected to match the absorption spectra of at least one species of the gas inside the container. The detector 2 may be, for example, a photodiode, a photomultiplier, a CCD detector, a CMOS detector, a Si detector, an InGaAs detector, PMT array, multiple optical fibres connected to separate detectors, Position sensitive detectors (PSD), selected to be able to detect the wavelengths or wavelength range of the light source.

The optical sensor 1, 2 may be hold by and/or arranged at a mechanical member, such as two beams, or a U-beam. The optical sensor 1, 2 may be arranged at a surface 7 of the mechanical structure, such as being an integrated part of the surface 7 of the mechanical structure. The surface 7, at which the optical sensor 1, 2 is arranged, may comprise of two sides arranged opposite each other. For example so that a light source 1 arranged at a first side, and a detector 2 arranged at a second side opposite the first side, or wherein a light source 1 and a detector 2 are arranged at a first side and a reflective surface is arranged at a second side opposite the first side. The surface 7, or sides, may be bevelled, such as being tilted or inclined, by an angle so that the distance between the two sides closer to the measuring area and/or the flexible area 3 of a container is increasing.

Alternatively, the optical sensor 1, 2 may be attached at, or an integral part of, an inner wall 7 of an open cavity 12. The open cavity may be arranged with an opening towards the flexible area 3 of a container. The inner wall of the cavity may be tilted or inclined so that a cross-sectional area is increasing towards the opening, such as the cavity having the shape of a cone, such as a truncated cone.

The system may further include a suction device 4 arranged for pulling at least a portion of the flexible area 3 a distance so that at least a part of the flexible area 3 being pulled ends up above the transmitted light signal 5. By pulling at least a portion of the flexible area 3 a distance, the portion being pulled may be arranged in a position where a space 6 is provided underneath at least the portion of the flexible area 3.

In some examples of the disclosure, the suction device 4 may be configured to pull at least a portion of the flexible area 3 into a position with respect to the optical sensor 1, 3 to provide a defined pathlength for the light signal transmitted through the space 6. The defined pathlength may have a predefined length and may be obtained in different ways. In some examples, the defined pathlength is obtained by pulling or lifting the portion of the flexible area 3 a distance from the container. When pulling or lifting at least a portion of the flexible area 3, a space may be obtained underneath the flexible area. The space 6 may have a predefined pathlength for the transmitted signal therethrough due to its shape or geometry. The space 6 obtained may have a cone like shape, such as a truncated cone, and may be obtained between an apex, where the flexible area 3 is being lifted, and a base, which may be either an edge of the container or an edge of the mechanical structure 11 limiting the portion being lifted.

Additionally, and/or alternatively, the defined pathlength through the space 6 may be obtained by the portion of the flexible area 3 being pulled and coming into contact with the surface 7 of the mechanical structure or the inner surface 7 of the open cavity.

In some examples, the suction device 4 is configured to pull at least the flexible area 4 into a position which may provide contact between at least the portion of the flexible area 4 and the optical sensor 1, 2. The contact may be a contact between a window of the optical sensor 1, 2 and at least the portion of the flexible area 4. For example, the contact may be a contact between a transmission area 1 (e.g. the light source) of the optical sensor and a detection area 2 (e.g. the detector) of the optical sensor and at least the portion of the flexible area. As the distance between the two areas of the sensor 1, 2 may be known, the pathlength through the space 6 may be well defined. Also, in some example, contact between the sensor 1, 2 and a portion of the flexible area 3 may exclude all air between the transmission area 1 and flexible area 3, and detection area 2 and flexible area 3. Reducing the amount of air in the path through which the light signal is transmitted, may decrease the likelihood of artefacts and errors in the measurements.

Alternatively, and/or additionally, in some examples, a sensor is arranged to determine when a contact has been obtained. When the sensor determines that there is a contact, the optical measurement may begin. The sensor may be a pressure sensor or a pin which may be pressed by the flexible area 3 entering the cavity.

Alternatively, and/or additionally, the suction device 4 may include at least one vacuum suction cup. The vacuum suction cup may be movable to move down and connect to the portion of the flexible area 3, as illustrated in FIG. 1A. After the suction cup has connected to the portion of the flexible area 3, the suction cup may move back up whereby a space 6 underneath the portion of the flexible area 3 is obtained, as illustrated in FIG. 1B.

Alternatively, and/or additionally, in some example may least one of the at least one vacuum suction cup includes a bellows. When a vacuum is obtained between suction device 4 and the flexible area 3, the bellows may compress and at least the portion of the flexible area 3 may automatically be pulled to the position, again as illustrated in figs, 1A and 1B. The suction device 4 may be stationary and not movable, whereby the flexible area 3 is lifted solely by a negative pressure in the bellows of the suction device 4 which compresses the bellows.

Alternatively, and/or additionally, in some examples the suction device 4 is intentionally pulled or lifted when a vacuum is created between at least the portion of the flexible area 3 and the suction cup. Either by a motor being part of the suction cup or the bellows.

Alternatively, and/or additionally, in some examples may the suction device 4 include multiple suction cups. By arranging multiple suction cups at different locations, the flexible area 3 may be shaped when pulled.

As described herein, an optical sensor 1, 2 may be arranged in relation to the measuring area for transmitting a light signal 5 through the space 6 being obtained when the portion of the flexible area 3 is lifted. The optical sensor 1, 2 is also detecting a transmitted light signal.

In some examples, the optical sensor 1, 2 includes optics for transmitting and detecting the light signal 5 at an angle. The angle is used to compensate for the angle of the surface 7 of the mechanical structure or the inner surface 7 of the open cavity 12, for example, when the surface 7 is bevelled. Utilizing optics for transmitting and detecting the light signal 5 at an angle allows the light signal 5 to be transmitted straight through the space 6 created beneath the flexible surface 3. This allows for a good contact between the flexible surface 3 and the optical sensor 1, 2 as well as a well-defined optical path length.

A control unit (not shown) may be configured for determining, based on the transmitted light signal detected by the optical sensor 1, 2, the concentration of the at least one gas in the container.

Alternatively, and/or additionally, in some examples may the control unit (not shown) be configured for determining, based on the transmitted light signal detected by the optical sensor 1, 2, an integrity of a sealed container.

Figure 2:
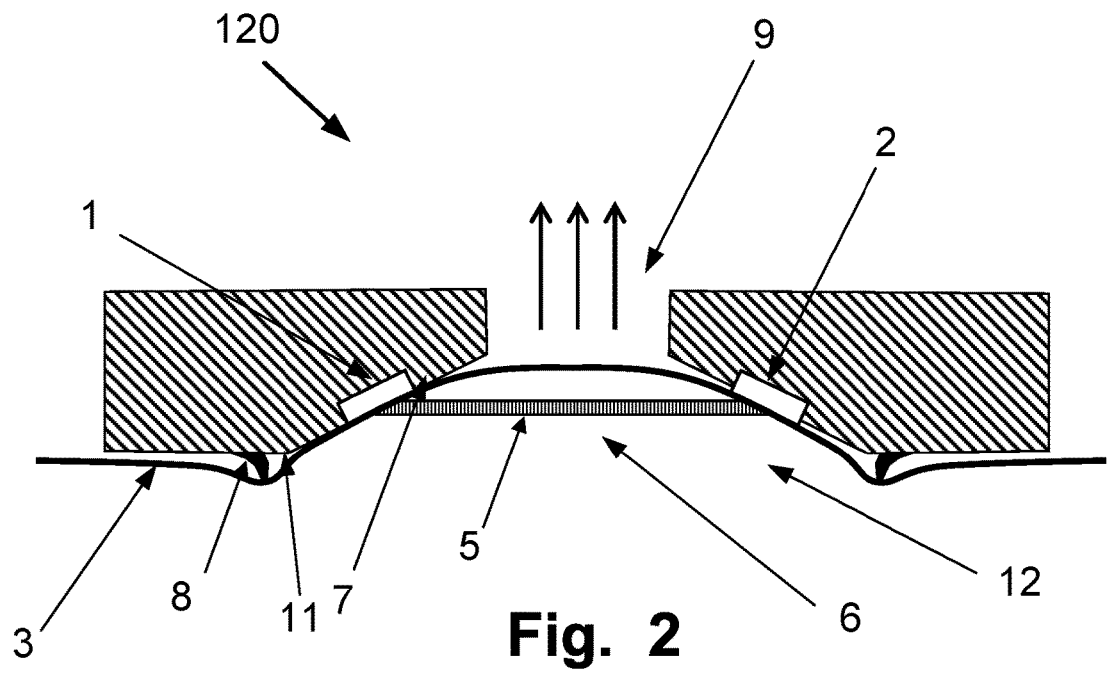
FIG. 2 is illustrating a schematic example of a system according to the description.

FIG. 2 is illustrating a system 120 which is similar to what has been described in connection with FIGS. 1A and 1B. For the system 120 illustrated in FIG. 2, an open cavity, which includes an inner wall 7, is positioned so that an opening 12 of the open cavity is arranged towards a measuring area (not shown). A container is positioned at the measuring area so that at least a portion of a flexible area 3 of the container is arranged towards the opening 12 of the open cavity.

Additionally, in some examples, an optical sensor 1, 2 is arranged at, or as an integrated part of, the inner wall 7 of the cavity.

A suction device is arranged to pull at least the portion of the flexible area into the open cavity towards the inner wall 7. In some examples, the part of the flexible area 3 pulled into the cavity may contact the inner walls 7, such as a window of the optical sensor, 1, 2.

As the distance between the two areas of the optical sensor 1, 2 may be known, the pathlength through the space 6 may be well defined. Also, in some example, contact between the optical sensor 1, 2 and a portion of the flexible are 3 may exclude all air between the transmission area 1 and flexible area 3, and detection area 2 and flexible area 3.

In some example a sensor is arranged to determine when the contact is obtained. When the sensor determines that there is a contact, the optical measurement may begin. The sensor may be a pressure sensor or a pin which may be pressed by the flexible area 3 entering the cavity.

An example of a sensor for determining when there is a contact is a pressure sensor configured for measuring the pressuring inside a cavity when the at least said flexible area is pulled into the position. The pressure inside the cavity may be correlated to when there is a contact.

Alternatively, and/or additionally, the sensor may be arranged inside the suction device 4 to measure the pressure in the suction device 4, such as in the suction cup.

In FIG. 2, the open cavity is a part of the suction cup and when a vacuum is arranged inside the open cavity at least a portion of the flexible area is positioned in the open cavity. To obtain a, negative pressure, such as a vacuum, in the cavity, a duct 9 may be arranged at the top of the cavity. The duct may be connected to a pump or fan to press air out of the cavity and thereby obtain a negative pressure, such as a vacuum. In some examples, the duct 9 may be position at another location of the cavity.

Additionally, in some example, to improve the creation of a negative pressure, such as a vacuum, a lip seal 8 may be arranged to surround or encircle the opening 12 of the cavity. For example, the lip seal 8 may apposition an edge 11 of the opening 12 of the cavity.

Figure 3:
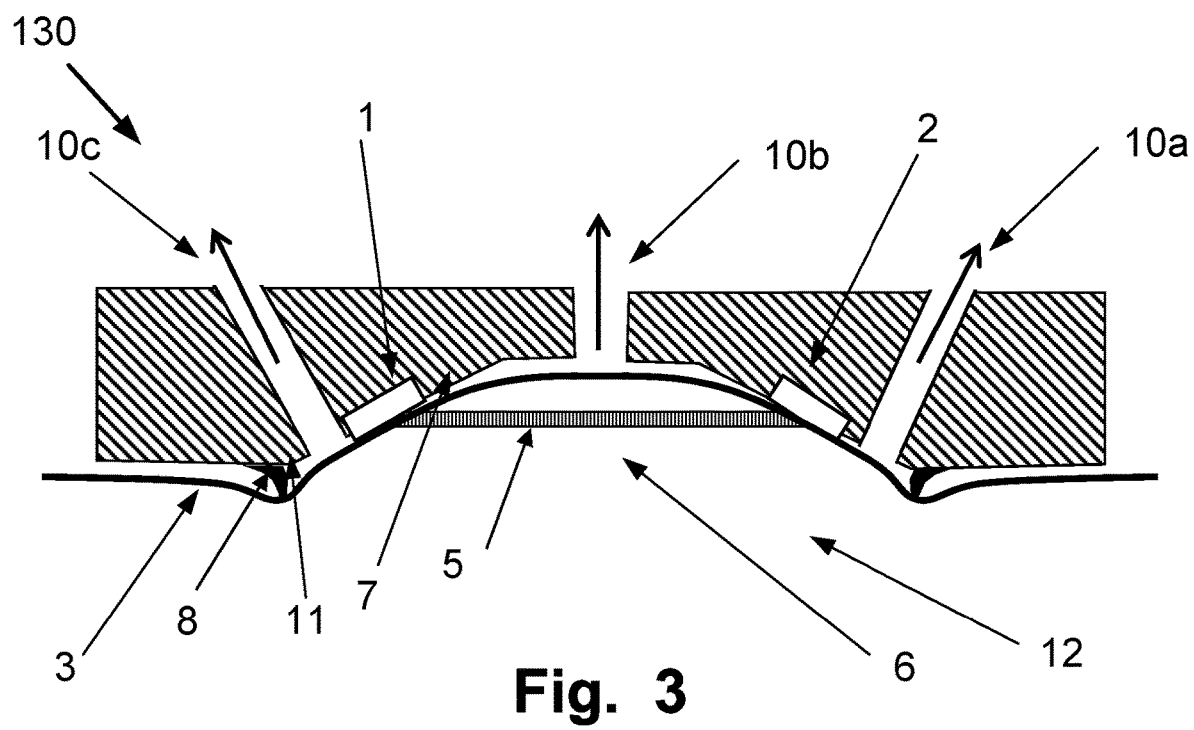
FIG. 3 is illustrating schematic examples of a system according to the description.

FIG. 3 is illustrating a system 130 similar to the system 120 illustrated in FIG. 2. In FIG. 3 the cavity acts as a suction device and includes multiple ducts 10*a-c* for improving the negative pressure, such as the vacuum, in the cavity. Multiple ducts 10*a-c* may also be used to shape the flexible area when being pulled into the cavity and improve the contact between the flexible material 3 and the optical sensor 1, 2.

Additionally, for any of the systems above, the optical sensor 1, 2 may transmit a light signal which has a polarization selected to improve transmission at a transmission angle. The transmission angle is the angle between the surface of the flexible area and the light signal, such as the transmission angle being Brewster's angle.

For reducing the noise and improving signal to noise of the signal during measurements, a vibration element may be arranged for vibrating the flexible area, at least when the light signal is transmitted through the space obtained. For example, the vibration element may vibrate the suction device, such as the suction cup and/or the bellows.

The vibrating element may be a vibrator, such as an acoustic vibrator or a motor vibrating the element to be vibrated.

Further, all systems illustrated in FIGS. 1 to 3 may be configures so that the light signal is transmitted, and the geometry is so, that the flexible area needs to be lifted very little, enabling measurements also on relatively tensed tray films. In these cases, the flexible area may be pulled a few millimetres, such as, 10 mm, such as 5 mm, such as 2 mm, and the optical sensor is positioned so that it can measure through the space obtained underneath the lifted flexible surface.

Figure 4A:
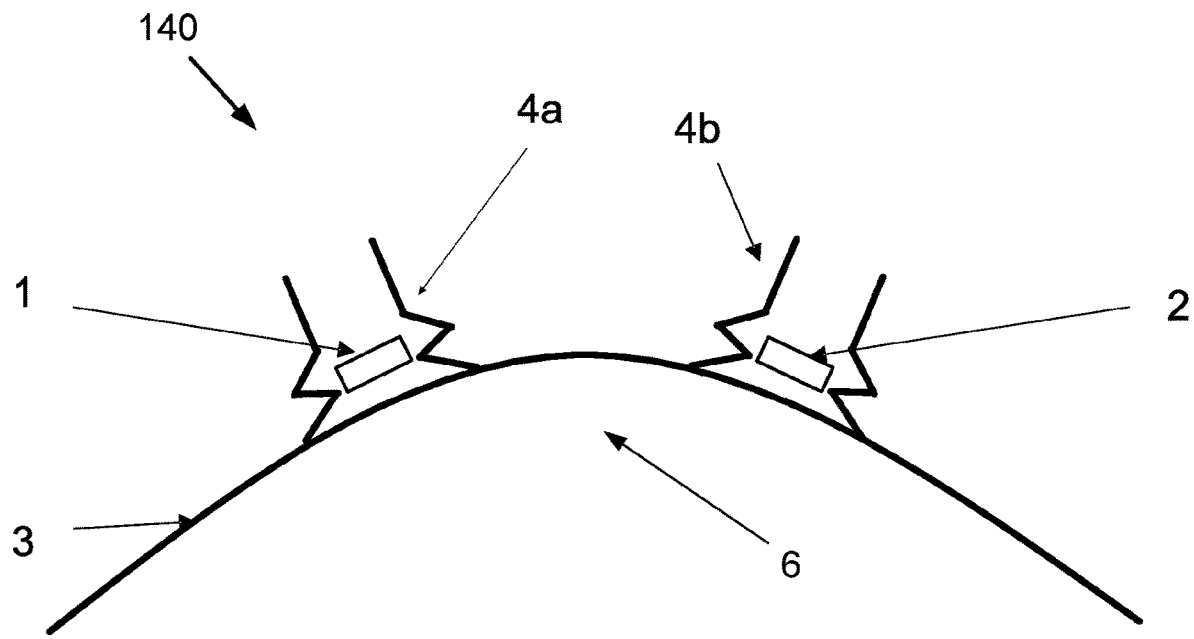
FIGS. 4A and 4B are illustrating a schematic example according to the disclosed system.
Figure 4B:
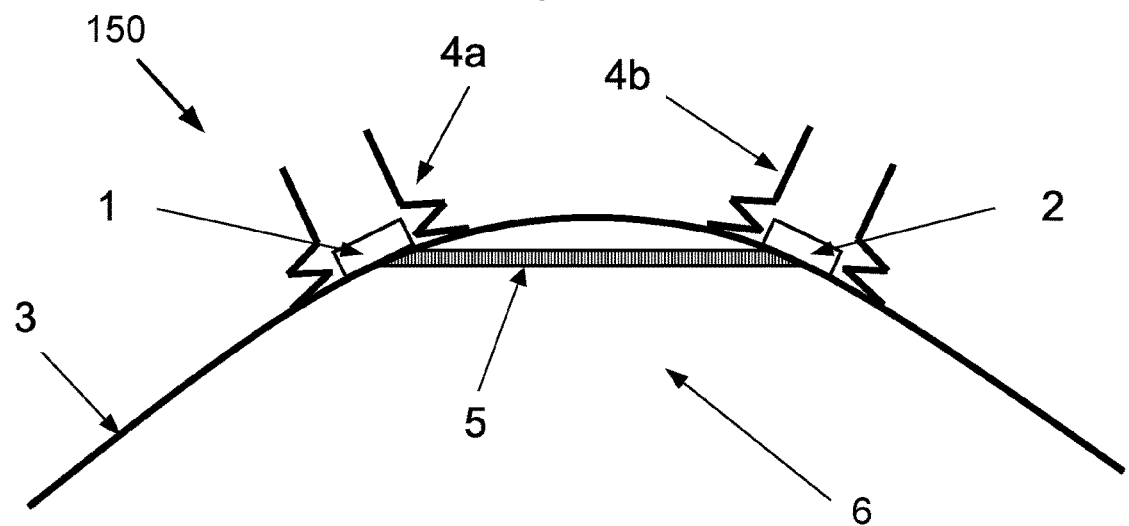

FIGS. 4A and 4B are illustrating a schematic example of a system 140, 150.

In the illustrated example, two suction devices 4a, 4b are used. The suction devices 4a, 4b are similar to the suction device 4 described in relation to FIGS. 1A and 1B. The suction devices 4a, 4b may be suction cups including bellows. One suction device 4a may be arranged around the light source 1 and another suction device 4b may be arranged around the detector 2.

In the illustrated example, a cavity as as illustrated in FIGS. 1A, 1B, 2 and 3 may not be required.

The suction device 4a, 4b may be connected to a single pump or each suction device 4a, 4b may be connected to a dedicated pump.

The bellows of the suction devices 4a, 4b may be extended in an initial phase. When a flexible surface 3 of a container comes in to contact with an edge of the suction devices 4a, 4b a negative pressure is obtained in the bellows and the bellows becomes compressed, thereby lifting the flexile surface 3. When the flexible surface 3 is lifted, the flexible surface 3 may come in to contact with the light source 1 and detector 2.

When the flexible surface 3 is lifted, a space 6 is created beneath the flexible surface 3. A light signal 5 may then be transmitted through the space 6 between the light source 1 and the detector 2.

In some examples, a sensor, such as a pressure sensor, is used for determining when there is a contact between the flexible surface 3 and the optical sensor 1, 2. The sensor may be arranged to measure a pressure inside the suction devices 4a, 4b. Measuring the pressure inside the suction devices 4a, 4b, it can be determined when a contact between the flexible surface 3 and the light source 1 and the detector 2 may be established. When the contact is established, the measurement can start and a light signal 5 may be transmitted between the light source 1 and the detector 2, through the created space 6 obtained beneath the lifted flexible surface 3 and inside the container.

The pressure should preferably stay low during the whole measurement to keep a sufficient contact between the light source 1 and detector 2. In some examples, should the pressure not be low enough, the measurement may be aborted.

The suction devices 4a and 4b may include mechanical means configured for adjusting an angles of the suction devices 4a, 4b. Adjusting the angle may be performed to accommodate for different products and thereby obtain a good contact.

Also, as described above, in some examples, the light source 1 and the detector 2 may include optics for adjusting an angle of the emitted light signal 5 to provide a straight transmission through the created space 6 between the light source 1 and the detector 2.

Figure 5A:
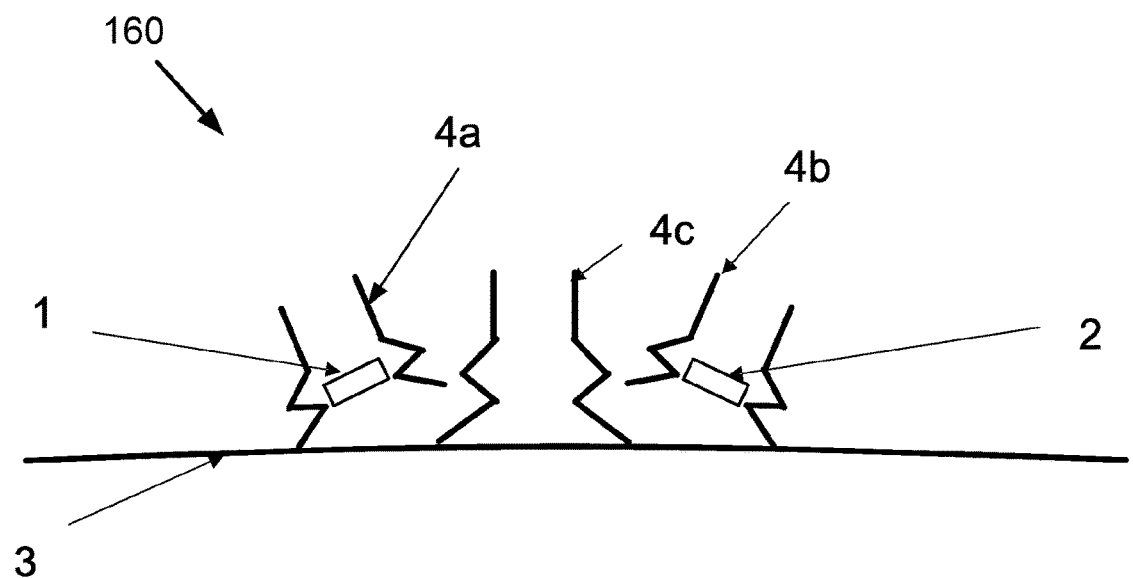
FIGS. 5A and 5B are illustrating a schematic example according to the disclosed system.
Figure 5B:
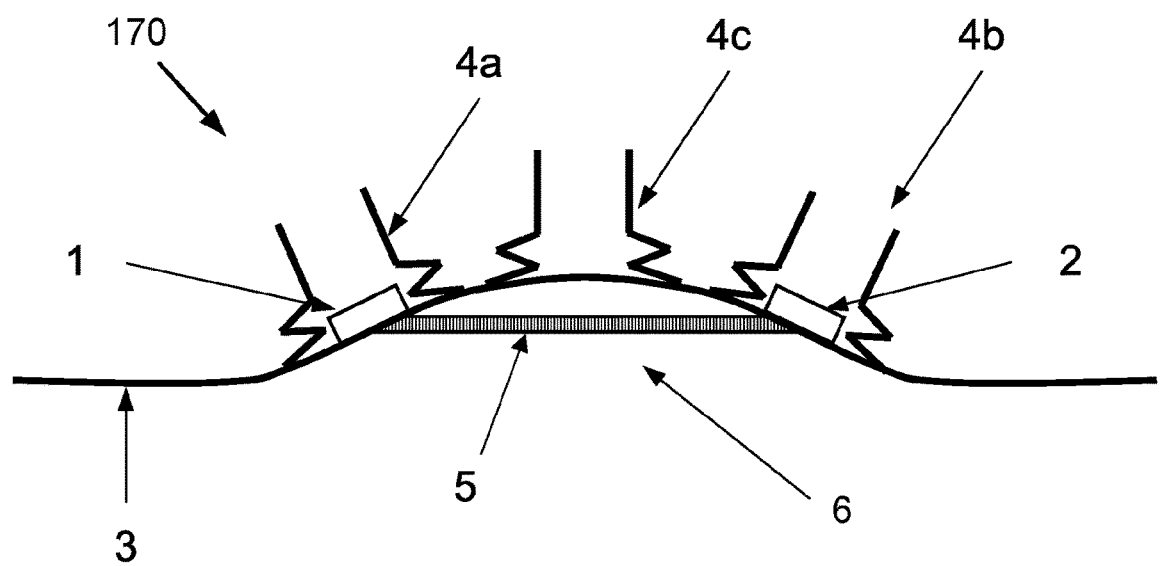

FIGS. 5A and 5B are illustrating a further example of a system 160, 170 similar to the example illustrated in FIGS. 4A and 4B.

In this example, there are more than two suction devices 4a, 4b, 4c, such as three or more. One suction device 4a is arranged around the light source 1 and another suction device 4b is arranged around the detector 2. One further suction device 4c is arranged between the suction devices 4a, 4b arranged around the light source 1 and detector 2. Any further suction devices 4c arranged between the other two suction devices 4a, 4b may be used for helping to lift the flexible surface 3 and to stretch the flexible surface 3 of the container providing a sufficient contact between the flexible surface 3 and the light source 1 and detector 2. Additionally, and/or alternatively, suction devices 4c may be arranged outside the suction devices 4a, 4b arranged around the light source 1 and the detector 2.

In their extended states, the bellows of the suctioned devices 4a, 4b, 4c may be touching the flexible surface 3.

Alternatively, as illustrated in FIG. 5a, in some examples, the suction device 4c grips the flexible surface 3 first, pulling it up so that the other two suction devices 4a, 4b arranged around the light source 1 and the detector 2 may grip the flexible surface 3.

In some examples, separate vacuum pumps may be used for each suction devices 4a, 4b, 4c. In some other examples, one vacuum pump may be used for the suctioned devices 4a, 4b arranged around the light source 1 and detector 2 and another pump may be used for the other suction devices 4c.

Additionally, and/or alternative, the vacuum in the suction devices 4a, 4b arranged around the light source 1 and detector 2 may be measured and when the pressure is low enough it will indicate a sufficient contact. When a sufficient contact has been established, the measurement starts and the light signal 5 is transmitted through the space 6. The pressure should preferably stay low during the whole measurement to keep a sufficient contact between the light source 1 and detector 2. In some example, should the pressure not be low enough the measurement may be aborted.

Figure 6:
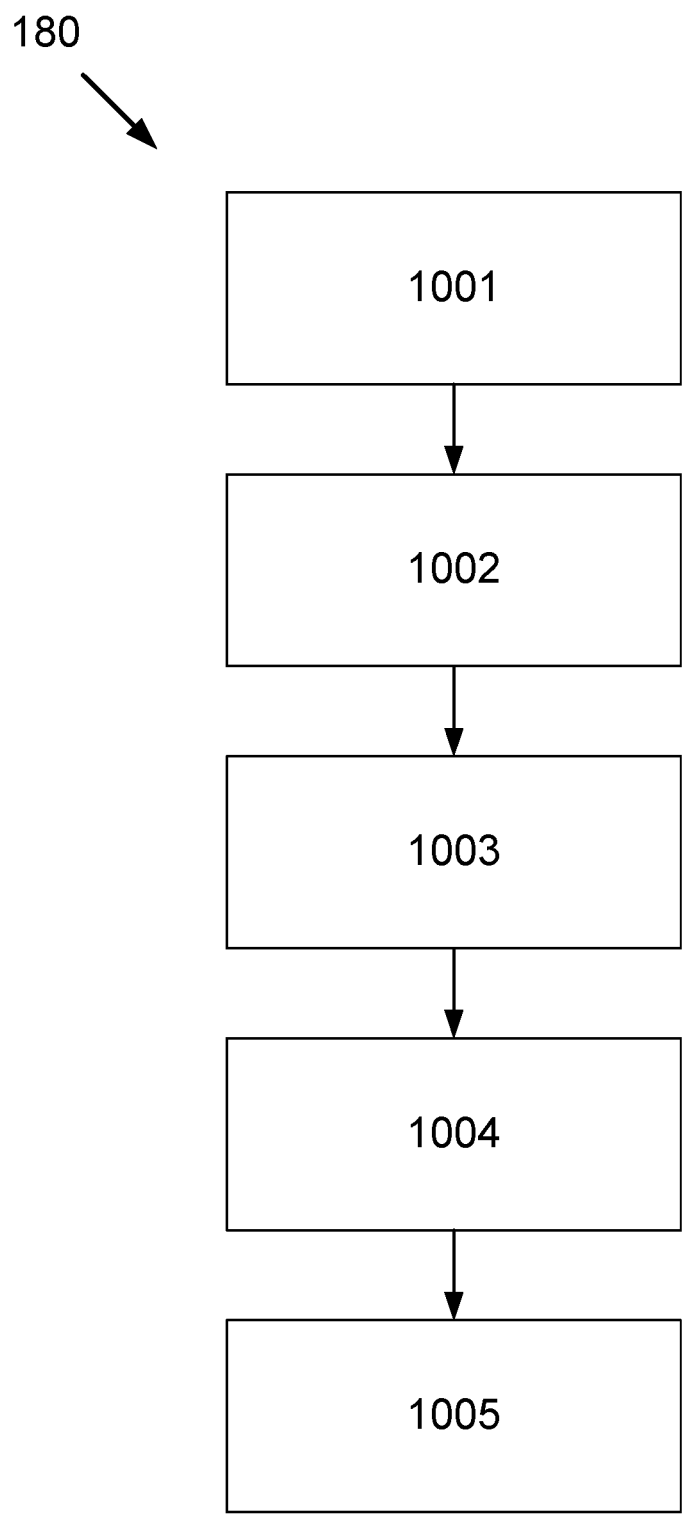
FIG. 6 is illustrating chart over a method according to the disclosure.

FIG. 6 is illustrating a flow-chart for a method 180 of determining a concentration of at least one gas in a container having at least one side with a flexible area.

The method may include:

Positioning 1001 the flexible area in relation to an optical sensor. The sensor may be configured to be sensitive to the at least one gas.

Pulling 1002 a portion of the flexible area a distance using a suction device. The pulling may arranging at least a portion of the flexible area in a position to provide a space underneath at least the portion of the flexible area.

Transmitting 1003 a light signal through the space using the optical sensor, and detecting 1004 a transmitted light signal using the optical sensor.

Determining 1005, based on the transmitted light signal, the concentration of the at least one gas in the container and/or an integrity of the seal container.

The present invention has been described above with reference to specific examples. However, other examples than the above described are equally possible within the scope of the disclosure. Different method steps than those described above, performing the method by hardware or software, may be provided within the scope of the invention. The different features and steps of the invention may be combined in other combinations than those described. The scope of the disclosure is only limited by the appended patent claims.

The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

What is claimed is:

1. A system for determining a concentration of at least one gas in a container having at least one side with a flexible area, said system comprising:
   a measuring area arranged to receive said container;
   a suction configured to pull at least one portion of said flexible area to arrange said at least one portion of said flexible area in a position such that a space is provided beneath said at least one portion of said flexible area;
   an optical sensor, configured to be sensitive to said at least one gas, is configured in relation to said measuring area to transmit a light signal through said space in a direction crossing a direction in which the suction pulls said at least one portion of said flexible area, and detect the transmitted light signal;
   a controller configured to determine, based on said transmitted light signal, said concentration of said at least one gas in said container.

2. The system of claim 1, wherein said controller is configured to determine an integrity of said container based on said concentration when the container is closed.

3. The system of claim 1, wherein said optical sensor comprises a light source arranged at a first side, and a detector arranged at a second side opposite said first side; or wherein a light source and a detector are arranged at a first side and a reflective surface is arranged at a second side opposite said first side.

4. The system of claim 1, wherein said suction is configured to pull at least said flexible area into said position to provide a defined pathlength for said light signal transmitted through said space.

5. The system of claim 1, wherein said suction is configured to pull at least said flexible area into said position to provide contact between at least said portion of the flexible area and said optical sensor, such as contact between a window of said optical sensor and at least said portion of the flexible area, such as between a transmission area of said optical sensor and a detection area of said optical sensor and at least said portion of the flexible area.

6. The system of claim 5, wherein a sensor is arranged to determine when said contact is obtained by measuring a pressure when at least said flexible area is pulled into said position.

7. The system of claim 1, wherein said suction comprises at least one vacuum suction cup.

8. The system of claim 7, wherein at least one of said at least one vacuum suction cup comprises a bellows, such as at least said portion of said flexible area is automatically pulled to said position.

9. The system of claim 7, wherein the optical sensor is arranged inside the vacuum suction cups, such as a light source is arranged in a first suction cup and a detector is arranged inside a second suction cup.

10. The system of claim 1, wherein said suction is pulled when a vacuum is created between at least said portion of said flexible area and said suction cup.

11. The system of claim 7, wherein said suction has multiple suction cups, placed to shape the flexible area when being pulled.

12. The system of claim 1, wherein an open cavity comprises an inner wall positioned so that an opening of said open cavity is arranged towards said measuring area, and when said container is positioned at said measuring area at least said portion of said flexible area is arranged towards said opening of said open cavity; said optical sensor is arranged at said inner wall; and said suction is arranged to pull at least said portion of said flexible area into said open cavity towards said inner wall when said container is arranged at said measuring area.

13. The system of claim 12, wherein said optical sensor is an integrated part of said inner wall.

14. The system of claim 12, wherein said open cavity is a part of said suction and when a vacuum is arranged inside said open cavity at least a portion of said flexible area is positioned in said open cavity.

15. The system of claim 14, wherein said open cavity has a lip seal surrounding said opening.

16. The system of claim 1, wherein a vibration element is arranged to vibrate said flexible area when said light signal is transmitted through said space, such as vibrating said suction.

17. A method of determining a concentration of at least one gas in a container having at least one side with a flexible area, said method comprising:
   positioning said flexible area in relation to an optical sensor configured to be sensitive to said at least one gas;
   pulling a portion of said flexible area using a suction to arrange said portion of said flexible area in a position such that a space is provided underneath said portion of said flexible area;
   transmitting a light signal through said space in a direction crossing a direction in which the suction pulls said portion of said flexible area, by using said optical sensor;
   detecting the transmitted light signal using said optical sensor; and
   determining, based on said transmitted light signal, said concentration of said at least one gas in said container.

18. The method of claim 17, wherein said at least one side with a flexible area is a top film of a tray or a portion of a bag.

19. A system for determining a concentration of at least one gas in a container having at least one side with a flexible area, said system comprising:
   a measuring area arranged to receive said container;
   a suction configured to pull at least one portion of said flexible area to arrange said at least one portion of said flexible area in a position such that a space is provided beneath said at least one portion of said flexible area;
   a pressure sensor configured to measure a pressure in said suction when said at least one portion of said flexible area is pulled into the position;
   an optical sensor, configured to be sensitive to said at least one gas, is configured in relation to said measuring area to transmit a light signal through said space in a direction crossing a direction in which the suction pulls said at least one portion of said flexible area, and detect the transmitted light signal; and
   a controller configured to determine, based on said transmitted light signal, said concentration of said at least one gas in said container.

* * * * *